April 22, 1958  C. K. CHATTEN ET AL  2,831,341
RELAXATION TESTING APPARATUS
Filed April 11, 1955  2 Sheets-Sheet 1
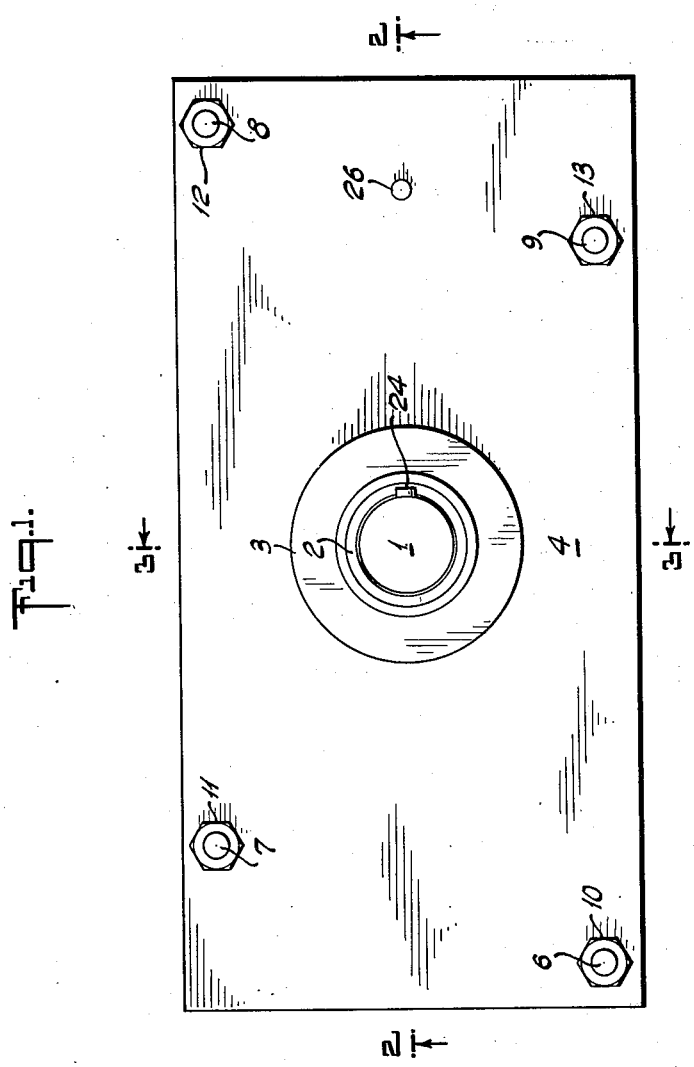
INVENTORS
CLARENCE K. CHATTEN
SAUL A. ELLER
BY
ATTORNEY April 22, 1958 C. K. CHATTEN ET AL 2,831,341
RELAXATION TESTING APPARATUS
Filed April 11, 1955 2 Sheets-Sheet 2
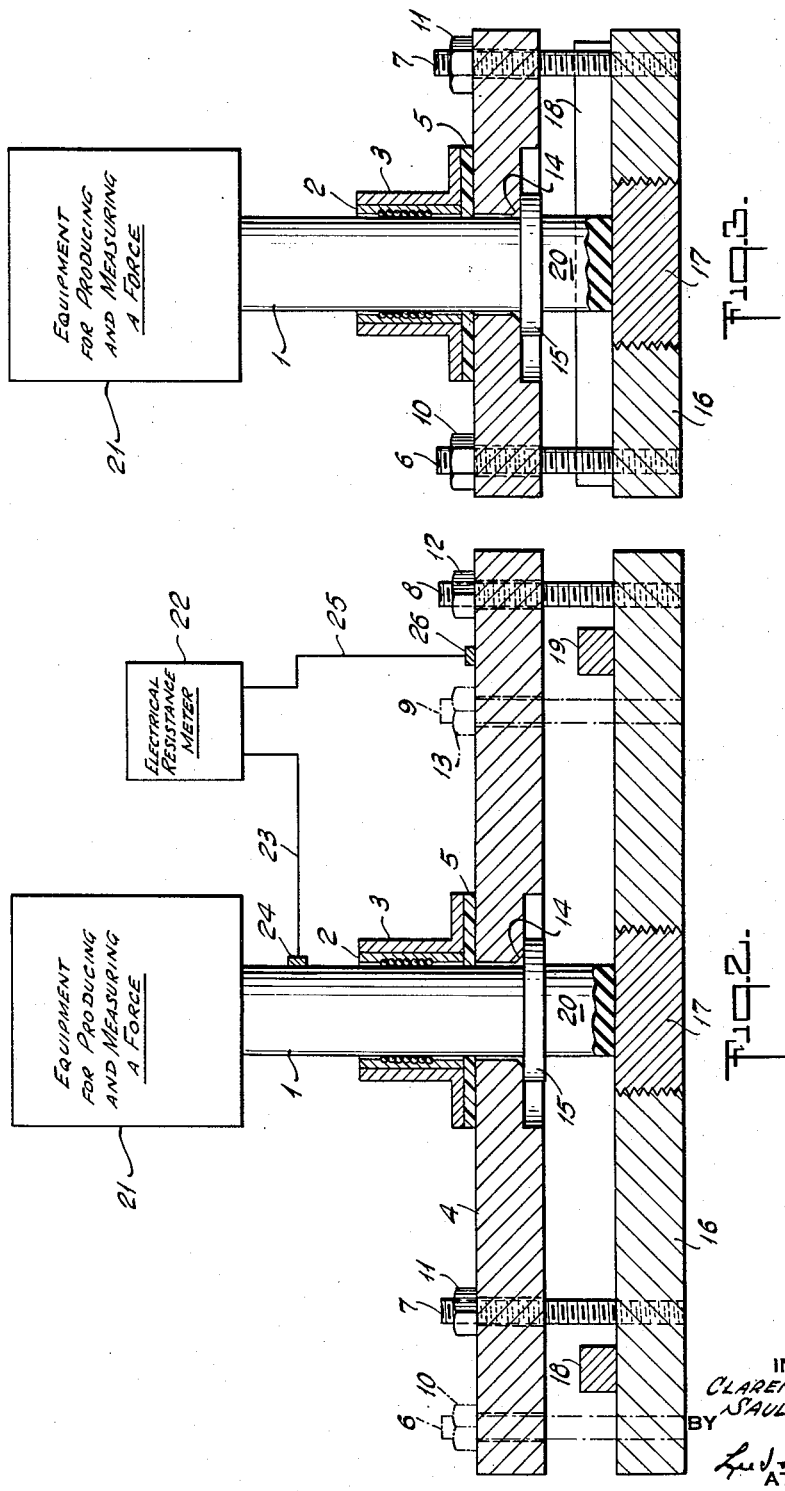
INVENTORS
CLARENCE K. CHATTEN
SAUL A. ELLER
BY
ATTORNEY

2,831,341

RELAXATION TESTING APPARATUS

Clarence K. Chatten, Jackson Heights, and Saul A. Eller, New York, N. Y., assignors to the United States of America as represented by the Secretary of the Navy Application April 11, 1955, Serial No. 500,711

8 Claims. (Cl. 73—94)

(Granted under Title 35, U. S. Code (1952), sec. 266)

The invention described herein may be manufactured and used by or for the Government of the United States of America for governmental purposes without the payment of any royalties thereon or therefor.

This invention concerns relaxation testing apparatus of the type utilized to measure the relaxation properties of non-metallic materials.

Relaxation may be defined as the loss in the force initially exerted by a material against its containing flanges with time. Relaxation testing apparatus of the prior art is subject to many inaccuracies and is very expensive to fabricate because of the close tolerance of parts necessitated by the nature of the apparatus. Among the causes of these inaccuracies are the necessity for manipulation of the test specimen in order to obtain proper stress readings and the difficulty in accurately compressing the test specimen to the desired deformation. Further inaccuracies ensue from excessive length of travel of the loading element, an unguided or a misguided loading element, and/or excessive friction in the moving elements.

The principal object of this invention is the provision of relaxation testing apparatus of great accuracy.

An object of this invention is the provision of relaxation testing apparatus having a low cost of fabrication.

An object of this invention is the provision of relaxation testing apparatus requiring no manipulation of the test specimen, once assembled.

An object of this invention is the provision of relaxation testing apparatus having facile and accurate compression control adjustments.

An object of this invention is the provision of relaxation testing apparatus requiring only a very short travel of the loading element.

An object of this invention is the provision of relaxation testing apparatus having an accurately guided loading element.

A further object of this invention is the provision of relaxation testing apparatus having little or no friction in the moving elements.

Other objects and many of the attendant advantages of this invention will be readily appreciated as the same becomes better understood by reference to the following detailed description when considered in connection with the accompanying drawings wherein:

Fig. 1 is a top view of the relaxation testing apparatus of the present invention with equipment for producing and measuring a force and an electrical resistance meter omitted;

Fig. 2 is a sectional view of the relaxation testing apparatus of Fig. 1 taken substantially along the line 2—2 of Fig. 1 with equipment for producing and measuring a force and an electrical resistance meter added; and Fig. 3 is a sectional view of the relaxation testing apparatus of Fig. 1 taken substantially along the line 3—3 of Fig. 1 with equipment for producing and measuring a force added and an electrical resistance meter omitted.

The loading element or plunger 1 is preferably of steel and of cylindrical form. The loading element 1 is slidably mounted in the ball bushing 2 which is coaxially supported by the bushing support 3. The bushing support 3 is preferably of cylindrical form having a radially flanged base and is securely insulatedly affixed to the top plate 4, through the insulator 5 (not shown in Fig. 1), in such a manner that it maintains the loading element in substantially vertical slidable position. The bushing support 3 and the top plate 4 are preferably of steel. The loading element 1, its bushing 2 and its bushing support 3 are coaxially positioned on the upper surface of the top plate 4 at the geometric center of said plate.

The coupling bolts 6, 7, 8 and 9 extend beyond the upper surface of the top plate 4. The corresponding nuts 10, 11, 12 and 13 are threaded on the coupling bolts 6, 7, 8 and 9, respectively. The electrical terminal 24 is on the shaft of the loading element 1 and the electrical terminal 26 is on the upper surface of the top plate 4.

The annular insulator ring 5 is positioned between the base of the bushing support 3 and the upper surface of the top plate 4 in such a manner that said bushing support, and thus the shaft of the loading element 1, is electrically insulated from said top plate. The insulator ring 5 may be of any suitable material, such as Bakelite. The top plate 4 has a shaft hole cut through it, at its geometrical center, of sufficient diameter to permit the shaft of the loading element 1 to slide freely in a vertical position without making either physical or electrical contact with said top plate. The lower surface of the top plate 4 at the shaft hole is flared at 14 to maintain electrical isolation between the shaft of the loading element 1 and said top plate. A coaxial annular recess is formed in the lower surface of the top plate 4 about the flared mouth of the shaft hole.

The loading element 1 has an integral radially extending flange 15 at its lower base. The flange 15 of the loading element 1 presents a substantially flat mating surface with the flat surface of the recess in the lower surface of the top plate 4. Thus, in the positions indicated in Figs. 2 and 3, the loading element 1 is in electrical contact with the top plate 4 through the upper surface of said flange 15 and the flat surface of the recess in the lower surface of said top plate 4. The lower surface of the flange 15 is coplanar, or flush, with the lower base of the loading element 1. The flange 15 has a thickness equal to the depth of the recess in the top plate 4 and a diameter smaller than that of said recess. Thus, in the positions indicated in Figs. 2 and 3, the lower surface of the loading element 1 is coplanar with the lower surface of the top plate 4.

The coupling bolts 6, 7, 8 and 9 are suitably affixed to the bottom plate 16 in substantially vertical position and extend through properly aligned holes through the top plate 4. The nuts 10, 11, 12 and 13 are suitably advanced along their corresponding coupling bolts 6, 7, 8 and 9 to maintain the top plate 4 at any selected one of several predetermined substantially horizontal positions above the bottom plate 16. The coupling bolts 6 and 9 and their respective corresponding nuts 10 and 13 are not shown in Fig. 2 because it is a sectional view taken along the line 2—2 of Fig. 1; they are dotted in position.

The bottom plate 16 is preferably of steel and has an adjustable base plug 17 threaded through it, at its geometrical center, coaxially with the loading element 1. The shims or spacing blocks 18 and 19 of predetermined dimensions rest on the upper surface of the bottom plate 16 and are preferably elongated type steel blocks with flat parallel surfaces. The spacing blocks 18 and 19 are positioned with their length dimensions parallel to the width dimensions of the top plate 4 and the bottom plate 16. The test specimen 20 rests on the adjustable base plug of the bottom plate 16 in axial alignment with the loading element 1.

A controlled force of compression is applied axially to the loading element 1 at its upper base by the equipment for producing and measuring a force 21 and is measured by said equipment. The equipment 21 may be any suitable equipment known in the art for producing and measuring a force. The electrical resistance between the loading element 1 and the top plate 4 is measured by the electrical resistance meter 22. The meter 22 may be any suitable meter known in the art for measuring the electrical resistance between bodies. The meter 22 is electrically connected to the loading element 1 by the electrical conductor 23 and the electrical terminal 24 on the shaft of said loading element. The meter 22 is electrically connected to the top plate 4 by the electrical conductor 25 and the electrical terminal 26 on the upper surface of said top plate.

The operation of the relaxation testing apparatus of the present invention is as follows.

The height or thickness of the test specimen 20 is measured and the spacing blocks 18 and 19 are selected in accordance with the measured height or thickness and placed in resting position on the upper surface of the bottom plate 16. The base plug 17 is adjusted, by rotation in its threaded seat in the bottom plate 16, to permit the desired compression of the test specimen. Thus, if it is desired to compress the test specimen 20%, the base plug 17 is adjusted to permit 80% compression of the original height or thicknesses of the test specimen. The spacing blocks 18 and 19 are selected of sufficient thickness to present surfaces which are coplanar with the upper surface of the test specimen 20, when the test specimen is compressed to its desired percentage (80%) and the test specimen is resting on the base plug and the spacing blocks are resting on the bottom plate 16.

The test specimen 20 is axially aligned on the base plug 17 and the top plate 4 is positioned with the lower surface of the flange 15 of the loading element 1 resting on said test specimen. The relaxation testing apparatus is then placed in cooperative relation with equipment for producing and measuring a force 21 in such a manner that the equipment 21 applies an axial compression force to the shaft of the loading element 1. The force applied to the loading element 1 is gradually increased, at a slow rate, until the test specimen 20 is compressed sufficiently to permit the lower surface of the top plate 4 to contact the upper surfaces of the spacing bars 18 and 19. At this instant, as from the initiation of the operation, the electrical resistance meter 22 indicates a small value of electrical resistance between the loading element 1 and the top plate 4. This is due to the metal-to-metal contact of the upper surface of the flange 15 of the loading element 1 with the flat surface of the recess in the lower surface of the top plate 4.

At the instant after the lower surface of the top plate 4 contacts the upper surfaces of the spacing bars 18 and 19 the upper surface of the flange 15 of the loading element 1 separates from flat surface of the recess in the lower surface of said top plate because at this instant said top plate no longer rests on said flange, but rests instead on said spacing bars. The instance of separation of the flange 15 from the top plate 4 is indicated by the electrical resistance meter 22 which jumps to a value many times greater than its previous value, due to the opening of the circuit between said flange and said top plate.

At the instant of separation, the nuts 10, 11, 12 and 13 are tightened on their respective coupling bolts 6, 7, 8 and 9 to a uniform torque and the axial compression force applied to the shaft of the loading element 1 is released.

After a few minutes (preferably about three minutes) an axial compression force is applied to the shaft of the loading element 1 until the instant of separation of the upper surface of the flange 15 of said loading element and the flat surface of the recess in the lower surface of the top plate 4; the instant of separation, is indicated by the abrupt increase in the electrical resistance reading of the electrical resistance meter 22. At the instant of separation the amount of axial compression force, applied by the equipment 21, is noted. At such instant of separation, the only reaction force on the shaft of the loading element 1 is the back or residual stress exerted by the compressed test specimen 20 in an axial direction upward. Therefore, the indication of the axial compression force applied, at the instant of separation, by the equipment 21, as measured by said equipment, plus the weight of the loading element 1 per unit area, is the initial back stress exerted by the test specimen 20, a few minutes (preferably 3 minutes) after being compressed.

After the initial back stress reading is noted, it is preferable to maintain the relaxation testing apparatus at room temperature for a period of time. The preferred room temperature period is about 60 minutes at about 74 degrees F. The relaxation testing apparatus is then aged in an oven, as desired. Such aging may occur for a period of about 46 hours at about 194 degrees F. After aging, the apparatus is cooled at room temperature. The cooling period, in the case of a 46 hour aging at 194 degrees F., is preferably about 5 hours at about 74 degrees F. The cooling period should be sufficient to return the test specimen to thermal equilibrium with room temperature.

When the test specimen 20 is at thermal equilibrium with room temperature, after suitable aging, an axial compression force is applied to the shaft of the loading element 1 until the instant of separation of the upper surface of the flange 15 of said loading element and the flat surface of the recess in the lower surface of the top plate 4; the instant of separation is indicated by the abrupt increase in the electrical resistance reading of the electrical resistance meter 22. At the instant of separation, the amount of axial compression force, applied by the equipment 21, is noted. The indication of the axial compression force applied, at the post-aging instant of separation, by the equipment 21, as measured by said equipment, plus the weight of the loading element 1 per unit area, is the final back stress exerted by the test specimen 20, after being aged.

The back stress exerted by the test specimen, in each case, is determined by the relation $$\text{Back stress } S = F + \frac{W}{A} \text{ or } \frac{L+W}{A}$$

where W is the weight of the loading element, in pounds, L is the axial compression load applied to the loading element, in pounds, A is the cross-sectional area of the test specimen, in square inches, and F is the axial compression load applied to the loading element, in pounds per square inch.

The percentage stress relaxation of the test specimen is determined by the relation $$\text{Percent stress relaxation} = \frac{S_I - S_F}{S_I}(100)$$

where $S_I$ is the initial back stress exerted by the test specimen, a few minutes after compression, in pounds or in pounds per square inch, and $S_F$ is the final back stress exerted by the test specimen, after aging, in pounds or in pounds per square inch. If $S_I$ is in pounds, then $S_F$ must be in pounds; if $S_I$ is in pounds per square inch, then $S_F$ must be in pounds per square inch.

After the final back stress exerted by the test specimen is noted, the apparatus is disassembled, the test specimen is removed and the height of the test specimen is measured a few seconds later; after several minutes, the height of the test specimen is again measured. The preferred times for measuring the height of the test specimen are about 10 seconds after its removal from the apparatus and about 30 minutes after its removal from the apparatus.

The percentage compression set of the test specimen is determined by the relation $$\text{Percent compression set} = \frac{h_o - h_F}{h_o - h_s}(100)$$

where $h_o$ is the original height or thickness of the test specimen, in inches, $h_F$ is the final height or thickness of the test specimen, after aging, in inches, and $h_s$ is the height or thickness of the spacing blocks, including correction for the base plug adjustment, in inches.

The value of $h_F$ used may be that measured at either time after the test specimen is removed from the apparatus. The correction for the base plug adjustment entails adding the distance of any depression of said plug below the upper surface of the bottom plate 16 to the height or thickness of the spacing blocks and subtracting the distance of any elevation of said plug above the upper surface of the bottom plate 16 from the height or thickness of the spacing blocks.

Obviously many modifications and variations of the present invention are possible in the light of the above teachings. It is therefore to be understood that within the scope of the appended claims the invention may be practiced otherwise than as specifically described.

We claim:

1. Relaxation testing apparatus for the relaxation and compression testing of a non-metallic test specimen in combination with equipment for producing and measuring a force, an electrical resistance meter and elongated spacing blocks of predetermined dimensions comprising a bottom plate having a centrally located threaded hole therethrough and a plurality of upward extending coupling bolts supported in substantially vertical position therein, a threaded base plug adjustably seated in said threaded hole, a top plate having a centrally located shaft hole therethrough with a slightly flared lower mouth and a coaxial annular recess about said lower mouth, said top plate having a plurality of holes therethrough adapted to cooperate with said coupling bolts to vertically align said top plate with said bottom plate, a plurality of nuts, each of said nuts cooperating with each of said coupling bolts to secure said top plate at a predetermined position above said bottom plate, an electrical insulating ring coaxially positioned about said shaft hole at its upper mouth, a cylindrical type bushing support coaxially positioned about said shaft hole on the upper surface of said insulating ring, said bushing support being securely insulatedly affixed in substantially vertical position through said insulating ring to said top plate, a ball type bushing supported in substantially vertical position by said bushing support, a cylindrical type loading element positioned through said shaft hole and supported in substantially vertical slidable position by said bushing, said test specimen being positioned between the lower base of said loading element and the upper surface of said base plug at rest on said base plug in axial alignment with said loading element, said loading element being adapted to receive an axial compression force on its upper base from said force producing and measuring equipment and transmit said force to said test specimen, said spacing blocks being positioned between said top plate and said bottom plate at rest on the upper surface of said bottom plate, an integral radially extending flange at the lower base of said loading element having an upper surface adapted to make good electrical contact with the flat recess surface of said top plate and a lower surface flush with the lower base of said top plate, said flange having a thickness equal to the depth of said recess and a diameter smaller than that of said recess, an electrical terminal on said loading element and an electrical terminal on said top plate, said electrical terminals being connected to said electrical resistance meter by electrical conductors.

2. Relaxation testing apparatus for the relaxation and compression testing of a non-metallic test specimen in combination with equipment for producing and measuring a force, an electrical resistance meter and elongated spacing blocks of predetermined dimensions comprising a bottom plate having a centrally located threaded hole therethrough and a plurality of upward extending coupling bolts supported in substantially vertical position therein, a threaded base plug adjustably seated in said threaded hole, a top plate having a centrally located shaft hole therethrough with a slightly flared lower mouth and a coaxial annular recess about said lower mouth, said top plate having a plurality of holes therethrough adapted to cooperate with said coupling bolts to vertically align said top plate with said bottom plate, means cooperating with each of said coupling bolts to secure said top plate at a predetermined position above said bottom plate, a cylindrical type loading element coaxially positioned through said shaft hole, means for supporting said loading element in substantially vertical slidable position, means for securely insulatedly affixing said supporting means to said top plate, said test specimen being positioned between the lower base of said loading element and the upper surface of said base plug at rest on said base plug in axial alignment with said loading element, said loading element being adapted to receive an axial compression force on its upper base from said force producing and measuring equipment and transmit said force to said test specimen, said spacing blocks being positioned between said top plate and said bottom plate at rest on the upper surface of said bottom plate, an integral radially extending flange at the lower base of said loading element having an upper surface adapted to make good electrical contact with the flat recess surface of said top plate and a lower surface flush with the lower base of said top plate, said flange having a thickness equal to the depth of said recess and a diameter smaller than that of said recess, means for electrically connecting said loading element and said top plate to said electrical resistance meter.

3. Relaxation testing apparatus for the relaxation and compression testing of a non-metallic test specimen in combination with equipment for producing and measuring a force, an electrical resistance meter and elongated spacing blocks of predetermined dimensions comprising a bottom plate having a centrally located threaded hole therethrough, a threaded base plug rotatably threaded in said threaded hole, a top plate having a centrally located shaft hole therethrough with a flared lower mouth and a coaxial annular recess about said lower mouth, means for securing said top plate in vertical alignment with said bottom plate at a predetermined position thereabove, a cylindrical type loading element coaxially positioned through said shaft hole, means for supporting said loading element in substantially vertical slidable position, means for securely insulatedly affixing said supporting means to said top plate, said test specimen being positioned between the lower base of said loading element and the upper surface of said base plug at rest on said base plug in axial alignment with said loading element, said loading element being adapted to receive an axial compression force on its upper base from said force producing and measuring equipment and transmit said force to said test specimen, said spacing blocks being positioned between said top plate and said bottom plate at rest on the upper surface of said bottom plate, an integral radially extending flange at the lower base of said loading element having an upper surface adapted to make good electrical contact with the flat recess surface of said top plate and a lower surface flush with the lower base of said top plate, said flange having a thickness equal to the depth of said recess and a diameter smaller than that of said recess, means for electrically connecting said loading element and said top plate to said electrical resistance meter.

4. Relaxation testing apparatus for the relaxation and compression testing of a non-metallic test specimen comprising a bottom plate having a centrally located threaded hole therethrough, a threaded base plug rotatably threaded in said threaded hole, a top plate having a centrally located shaft hole therethrough with a flared lower mouth and a coaxial annular recess about said lower mouth, means for securing said top plate in vertical alignment with said bottom plate at selected predetermined positions thereabove, said securing means being removably cooperative with said plates, a cylindrical type loading element coaxially positioned through said shaft hole, means for supporting said loading element in substantially vertical slidable position, means for securely insulatedly affixing said supporting means to said top plate, said test specimen being at rest on said base plug in axial alignment with said loading element between the lower base of said loading element and the upper surface of said base plug, said loading element being adapted to receive an axial compression force on its upper base and to transmit said force to said test specimen, an integral radially extending flange at the lower base of said loading element having an upper surface adapted to make good electrical contact with the flat recess surface of said top plate and a lower surface flush with the lower base of said top plate, said flange having a thickness equal to the depth of said recess and a diameter smaller than that of said recess, means for electrically connecting said loading element and said top plate to an electrical resistance meter.

5. Relaxation testing apparatus for the relaxation and compression testing of a non-metallic test specimen comprising: a bottom plate having a centrally located base plug in vertically adjustable position therein, a top plate having a centrally located hole therethrough with a coaxial annular recess about the lower mouth thereof, means for securing said top plate in vertical alignment with said bottom plate at selected predetermined positions thereabove, said securing means being removably cooperative with said plates, a cylindrical type loading element coaxially positioned through said hole, means for supporting said loading element in substantially vertical slidable position, means for securely insulatedly affixing said supporting means to said top plate, said test specimen being at rest on said base plug in axial alignment with said loading element, said loading element being adapted to receive an axial compression force on its upper base and to transmit said force to said test specimen, means for indicating the instant at which the lower base of said loading element becomes non-planar with the lower surface of said top plate, said indicating means including means for electrically connecting said loading element and said top plate to an electrical resistance meter.

6. Relaxation testing apparatus for the relaxation and compression testing of a non-metallic test specimen comprising: a bottom plate having a centrally located vertically adjustable base plug positioned therein, a top plate having a centrally located hole therethrough, a cylindrical type loading element coaxially positioned through said hole, means affixed to said top plate for insulatedly supporting said loading element in substantially vertical slidable position, means removably cooperative with said plates for securing said top plate in vertical alignment with said bottom plate at selected predetermined positions thereabove, said test specimen being at rest on said base plug in axial alignment with said loading element, said loading element being adapted to receive an axial compression force on its upper base and to transmit said force to said test specimen, means for indicating the instant at which the lower base of said loading element becomes non-planar with the lower surface of said top plate, said indicating means including means for electrically connecting said loading element to said top plate through an electrical resistance meter.

7. Relaxation testing apparatus comprising a rigid element having a planar surface area for face-to-face abutting engagement with one end of a test specimen that has substantially planar and parallel ends, a cylindrical unitary loading element terminating at one end in a planar surface area perpendicular to the axis thereof for face-to-face abutting engagement with the opposite end of the test specimen, said loading element having a flange at said one end thereof, the flange having a conductive planar surface parallel to but facing in a direction opposite to the planar surface area at said end of said loading element, a second rigid element having a hole therethrough, said loading element extending through said hole, bearing means for said loading element secured to said second rigid element in line with the hole therein to ensure axial movement of said loading element through the hole, said second rigid element having a conductive planar surface surrounding one end of the hole and perpendicular to the axis of the hole, whereby upon axial movement of said loading element said conductive planar surfaces are movable into or out of face-to-face abutting engagement, insulating means on at least one of said loading and second elements to electrically isolate said conductive surfaces when they are not in face-to-face abutment, electrical indicating means connected in series with said two conductive planar surfaces to indicate whether or not said conductive surfaces are in abutment, and adjustable means for securing said first and second elements a selected distance apart with the test specimen between the planar surfaces on said first element and on said one end of said loading element.

8. Relaxation testing apparatus as defined in claim 7 wherein the first-mentioned rigid element includes an adjustable base plug and the planar surface area thereof is on said base plug.

References Cited in the file of this patent

UNITED STATES PATENTS

| 1,014,842 | Mockenfusi | Jan. 16, 1912 |
| 2,070,862 | Healy | Feb. 16, 1937 |
| 2,482,147 | Bashore | Sept. 20, 1949 |
| 2,691,886 | Cole | Oct. 19, 1954 |

OTHER REFERENCES

"Tentative Method of Test for Plasticity and Recovery of Rubber and Rubber-like Materials by the Parallel Plate Plastometer," A. S. T. M. Standards on Rubber Products, April 1950 (pp. 1156–1158).